US012779437B2

(12) United States Patent
Meissner et al.

(10) Patent No.: US 12,779,437 B2
(45) Date of Patent: Nov. 3, 2026

(54) METHOD AND CATALYST FOR PRODUCING PHENOLIC BUILDING BLOCKS FROM LIGNIN

(71) Applicant: Heraeus Deutschland GmbH & Co. KG, Hanau (DE)

(72) Inventors: Gisa Meissner, Hanau (DE); Hendrik Spod, Hanau (DE); Silke Krack, Hanau (DE); Karsten Kamb, Hanau (DE); Birgit Kamm, Linz (AT); Raphaela Süss, Linz (AT)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 497 days.

(21) Appl. No.: 18/549,780

(22) PCT Filed: Mar. 1, 2022

(86) PCT No.: PCT/EP2022/055063
§ 371 (c)(1),
(2) Date: Sep. 8, 2023

(87) PCT Pub. No.: WO2022/189198
PCT Pub. Date: Sep. 15, 2022

(65) Prior Publication Data

US 2024/0157342 A1 May 16, 2024

(30) Foreign Application Priority Data

Mar. 11, 2021 (EP) .................................... 21161951

(51) Int. Cl.
*B01J 23/755* (2006.01)
*B01J 23/89* (2006.01)
(Continued)

(52) U.S. Cl.
CPC ........... *B01J 23/755* (2013.01); *B01J 23/892* (2013.01); *C08J 11/24* (2013.01); *B01J 35/73* (2024.01); *B01J 2235/00* (2024.01)

(58) Field of Classification Search
None
See application file for complete search history.

(56) References Cited

U.S. PATENT DOCUMENTS

2012/0123171 A1 * 5/2012 Carter .................. C07C 37/002 568/651
2014/0275468 A1 9/2014 Kellett et al.
(Continued)

FOREIGN PATENT DOCUMENTS

CN 105669381 A 6/2016
CN 111389453 A 7/2020

OTHER PUBLICATIONS

Agarwal Ashutosh, et al., "Advancement in technologies for the depolymerization of lignin" Fuel Processing Technology, Elsevier BV, NL, vol. 181, Sep. 25, 2018 (Sep. 25, 2018), pp. 115-132 DOI: 10.1016/J.FUPROC2018.09.017 ISSN: 0378-3820, XP085523102; paragraph [3.1.3.1.]—paragraph [3.1.3.2.].
(Continued)

*Primary Examiner* — Guinever S Gregorio
(74) *Attorney, Agent, or Firm* — Blank Rome LLP

(57) ABSTRACT

The invention relates to a method for the catalyzed decomposition of lignin with a high yield and high selectivity for phenolic building blocks and with minimal formation of the coke fraction, and to a catalyst suitable for the method. The catalyst contains a basic carrier material, platinum at a weight percentage of 1-10 wt. % and nickel at a weight percentage of 0-5 wt. %. The method comprises: providing a reaction mixture comprising—lignin, —the catalyst and —a solvent; and heating the reaction mixture so as to obtain
(Continued)

Figure 1:
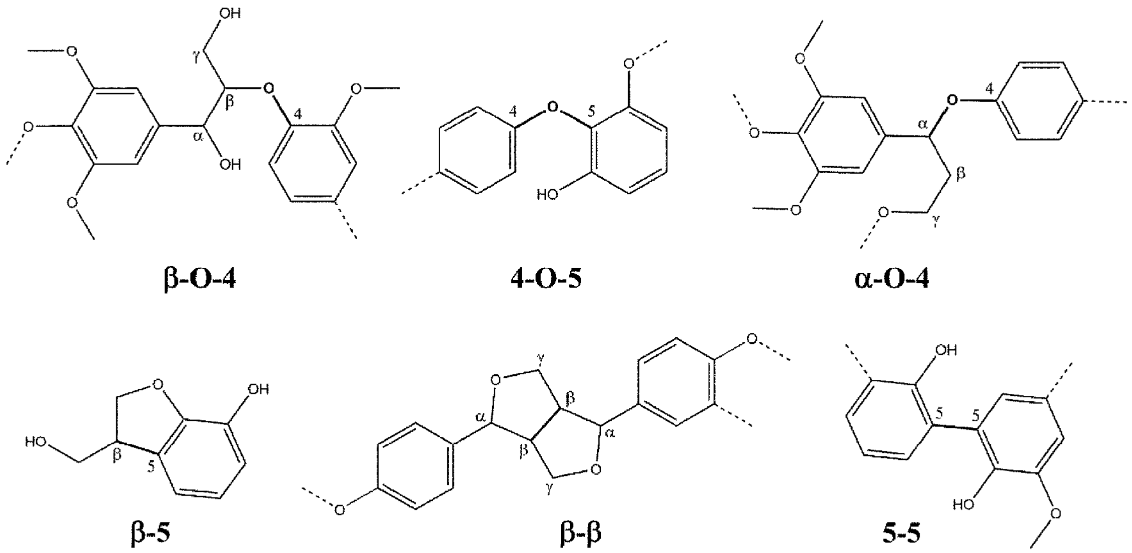

a mixture comprising—a product mix, —the catalyst and —the solvent.

18 Claims, 3 Drawing Sheets

(51) Int. Cl.
*C08J 11/24* (2006.01)
*B01J 35/73* (2024.01)

(56) References Cited

U.S. PATENT DOCUMENTS

| | | | | |
|---|---|---|---|---|
| 2015/0224485 | A1 | 8/2015 | Mcguire | |
| 2017/0145043 | A1* | 5/2017 | Subramaniam | C07C 41/18 |
| 2017/0152278 | A1* | 6/2017 | Samec | C08H 6/00 |
| 2019/0127304 | A1* | 5/2019 | Luterbacher | C07C 41/01 |
| 2019/0201873 | A1* | 7/2019 | Crocker | B01J 37/08 |

OTHER PUBLICATIONS

Toledano Ana, et al., "Microwave-assisted depolymerisation of organosolv lignin via mild hydrogen-free hydrogenolysis: Catalyst screening" Applied Catalysis B. Environmental, Amsterdam, NL, vol. 145, Feb. 1, 2014 (Feb. 1, 2014), pp. 43-55 DOI: 10.1016/j.apcatb.2012.10.015 ISSN: 0926-3373, XP055830265; the whole document.

Park Jeesu, et al. "Comparison of degradation features of lignin to phenols over Pt catalysts prepared with various forms of carbon supports" , vol. 6, No. 21, Jan. 1, 2016 (Jan. 1, 2016), pp. 16917-16924, RSC Advances, Retrieved from the Internet: https://pubs.rscorg/en/contenUarticlepdf/2016/ra/c5ra21875f DOI: 10.1039/C5RA21875F XP055830268; the whole document.

Antonio Pineda, et al., "Heterogeneously catalyzed lignin depolymerization", Appl Petrochem Res (2016) 6:243-256 DOI 10.1007/s13203-016-0157-y.

Jacob S. Kruger et al., "Lignin Depolymerization with Nitrate-Intercalated Hydrotalcite Catalysts", ACS Catalysis, Green Chem., 2014, 16, 824.

Chaudhary, et al., "Solid base catalyzed depolymerization of lignin into low molecular weight products, Green Chemistry", Green Chem., 2017, 19, 778.

Lopez, et al., "Study of hydrotalcite-supported transition metals as catalysts for crude glycerol hydrogenolysis", Molecular Catalysis 468 (2019) 9-18.

Zhou et al., Microwave Assisted Depolymerization of Alkaline Lignin over Hydrotalcite-Based CuNiAl Mixed Oxides, ACS Sustainable Chemistry & Engineering, 2018, 6, 11519-11528.

Du, et al., "Ni-Mg-Al Catalysts Efectively Promote Depolymerization of Rice Husk Lignin to Bio Oil", Catalysis Letters, vol. 150 (2020) pp. 1591-1604, Dec. 5, 2019, Springer.

Sturgeon et al., "Lignin depolymerisation by nickel supported layered-double hydroxide catalysts", Green Chemistry, Green Chem., 2014, 16, 824.

Zhou et al., "Catalytic in Situ Hydrogenolysis of Lignin in Supercritical Ethanol: Effect of Phenol, Catalysts and Reaction Temperature", ACS Sustainable Chemistry & Engineering, ACS Sustainable Chem. Eng. 2018, 6, 6867-6875.

Barta et al., "Depolymerization of organosolv lignin to aromatic compounds over Cu-doped porous metal oxides", Green Chemistry, 2014, 16, 191.

* cited by examiner

METHOD AND CATALYST FOR PRODUCING PHENOLIC BUILDING BLOCKS FROM LIGNIN

The production of chemical building blocks from renewable sources is becoming increasingly important as global supplies of conventional fossil resources are limited. The use of biomass from renewable raw materials as a basis for obtaining a wide range of chemicals is therefore the subject of intensive research efforts. Lignocellulosic material, which can be obtained from agricultural and forestry sources such as wood, is available in an almost unlimited and renewable supply. It consists of three main components: cellulose, hemicellulose and lignin. While the potential uses of the first two components for the synthesis of basic chemicals or fuel components have already been relatively well studied, the use of lignin as a raw material has not yet been established to the same extent.

Lignin is one of the most abundant biopolymers and the only one composed of aromatic monomer building blocks. It is an amorphous 3-D polymer found mainly in the cell walls of plants. The monomer building blocks, referred to as monolignins, comprise mainly phenylpropane alcohols, mainly cumaryl alcohol, coniferyl alcohol and sinapyl alcohol. The aromatic rings can carry varying substituents, such as hydroxyl groups, alkoxy groups, ether groups, alkyl groups, aldehyde groups, or ketone groups; the exact composition as well as the molecular weight vary from plant to plant. The individual building blocks are linked via different types of bonds, such as alkyl, aryl, and ether bonds; β-O-4 linking is the most common. FIG. 1 gives an overview of the various types of bonds in lignin.

Figure 2:
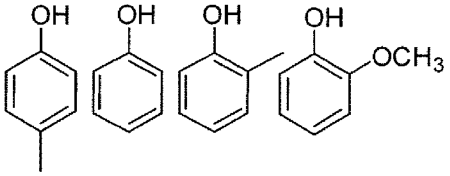

The underlying polyphenol structure makes lignin an ideal candidate to serve as a starting material for the synthesis of high-value aromatic fine chemicals, which can serve as a basis for the synthesis of other chemical products. FIG. 2 shows, by way of example, phenol components which illustrate the different structural motifs of such desired phenol components. However, the heterogeneity of the lignin structure makes it difficult to develop effective and selective processes for obtaining low-molecular-weight components.

Lignin can be isolated from wood (e.g., pine, poplar, birch), annual plants (e.g., wheat straw, miscanthus, switchgrass), or agricultural residues (e.g., sugarcane bagasse) by various extraction processes, and the macromolecular structure of the lignin is highly dependent on the botanical source, location, season, and isolation process. A number of methods already exist for the decomposition of lignin, including pyrolysis, acid or basic hydrolysis and more selective catalytic reactions, as well as biological methods using enzymes. An overview of such processes in the context of biorefinery processes can be found, for example, in "Biorefineries-Industrial Processes and Products" (Kamm et al., in Ullmann's Encyclopedia of Industrial Chemistry, Electronic Release, 7th ed. WILEY-VCH, 2007). It may be necessary to separate the lignin before depolymerization, for which purpose, for example, the organosolv process has become established, in which lignocellulosic starting material is separated into lignin and other carbohydrate-containing constituents.

An undesirable decomposition product in the depolymerization of lignin can be polymeric components formed by radical rearrangement reactions. These components are generally referred to as the coke fraction, as "coke", "char" and/or "tar", and are amorphous, inhomogeneous product fractions that cannot be further processed. In particular in uncatalyzed reactions or when catalysts with unsuitable selectivity are used, the formation of this fraction reduces the yield of desired products, as illustrated for example in "Catalytic Transformation of Lignin for the Production of Chemicals and Fuels" (Li et al. Chem. Rev. 2015, 115, 11559-11624).

One type of catalyzed decomposition reaction is base-catalyzed depolymerization (BCD), in the homogeneous version of which the lignin to be decomposed is treated with the solution of a mineral base at high temperatures and high pressure. Although this reaction is suitable for producing at least partially desired products, such as phenol and catechol derivatives, it is not industrially applicable on a large scale due to the large amounts of strongly basic solution residues that are generated. An alternative is the use of a heterogeneous catalyst that can be easily separated from the reaction mixture after the reaction and reused.

Typically, such reactions are performed in an inert gas and/or hydrogen atmosphere, which significantly increases the requirements for the process technology used compared to a process that can take place under atmospheric conditions.

Chaudharya et al. (Green Chemistry, 2017, 19, 778, 788) describe, for example, a range of transition metal-free catalysts suitable for BCD of lignin, including zeolites, metal oxides, hydrotalcites, and hydroxyapatite. The reaction conditions described enable the production of relevant monomer and oligomer building blocks, but only with a low yield and with high catalyst usage.

Carrier materials provided with transition metals are a further class of catalysts which are suitable for the decomposition of lignin. U.S. Pat. No. 9,631,146B2 describes, for example, a method in which nickel on a layered double hydroxide is used as a catalyst. However, studies of such a system showed that the yield of desired products was relatively low due to a high proportion of the coke fraction in the reaction product.

An object of the present invention was to provide a method for the catalyzed decomposition of lignin with a high yield and high selectivity for phenolic building blocks and with minimal formation of the coke fraction. It was also an object of the present invention to find a method for decomposition under mild reaction conditions, i.e. low temperature, low pressure and without an inert gas or hydrogen atmosphere. Furthermore, part of the object was to minimize the amount of catalyst required.

The object was also to provide a catalyst suitable for use in the method to be found.

According to a first aspect of the present invention, the object is achieved by a method comprising a) providing a reaction mixture A comprising lignin, a catalyst and a solvent;

b) heating the reaction mixture A so as to obtain a mixture B comprising a product mix, the catalyst and the solvent;

wherein the catalyst contains a basic carrier material, platinum at a weight percentage of 1-10 wt. % and nickel at a weight percentage of 0-5 wt. %.

In the method according to the invention, a catalyst is used which contains platinum and optionally nickel on a basic carrier material. In the context of the present invention, it has been found that the use of platinum or the combination of these two transition metals leads to a high conversion of the lignin used together with selectivity for the formation of low-molecular-weight constituents. Conversion in this respect is to be understood as the total amount of product fractions formed. This is also associated with an increased yield, i.e. an increased proportion of the reusable oligomeric and monomeric product fractions in relation to the lignin used. Selectivity in this context means that mainly monomeric and oligomeric phenolic building blocks are formed as low-molecular-weight product fractions and that the formation of the aforementioned coke fractions is avoided.

Preferably, a product mix with a small proportion of the coke fraction is obtained by the method according to the present invention.

For the purposes of the present invention, the coke fraction is understood to be the product fraction which is soluble neither in water nor in the organic solvents THE and ethyl acetate. These are mainly polymeric fractions formed by radical rearrangement reactions of the lignin to be decomposed. However, low-molecular-weight carbon components or short-chain hydrocarbons which can be formed by competing reaction pathways may also be included. Since this fraction is not soluble in virtually all common solvents, further characterization is problematic or even impossible. In the context of the present invention, insoluble is understood to mean that a substance dissolves to less than 0.1 g/L in the corresponding solvent at 25° C. and 1013 hPa.

The present invention relates to a method for the catalyzed decomposition of lignin.

Lignin is understood here to mean lignin model components, lignin-containing untreated biomass, lignin-containing fractions from treated biomass, and lignins from treated biomass. The biomass may consist of lignocellulose, but cellulose and hemicellulose may have been fully or partially separated. The biomass can comprise, for example, wood, straw, bagasse, recycled wood, or late-mown grass.

The treatment can be performed by chemical pretreatment, by physical methods or by biological methods.

In a preferred embodiment, the lignin is derived from biomass, wherein the biomass may be selected from the group containing wood, straw, bagasse, and late-mown grass. The lignin is preferably selected from the group containing organosolv lignin, kraft lignin, lignin obtained by alkaline digestion, lignin obtained by the sulfate method, lignin obtained by the sulfite method, lignin obtained by extraction with water, lignin obtained by hydrolysis with acids, lignin obtained by enzymatic hydrolysis, lignin obtained by saccharification of wood, lignin obtained by treatment with micro-organisms, lignin from biorefinery process streams containing lignin, and mixtures thereof.

The lignin preferably has an average molecular weight in the range of 3,000 g/mol-20,000 g/mol, more preferably in the range of 4,000 g/mol-15,000 g/mol.

"Decomposition" is understood to mean the deconstruction of polymeric lignins into oligomeric or monomeric building blocks of lower molecular weight, wherein the bonds between the building blocks are completely or partially broken. The term "depolymerization" can also be used as a synonym.

The method according to the invention comprises providing a reaction mixture A comprising lignin, a catalyst and a solvent.

The catalyst is preferably a supported catalyst. Supported catalysts are generally understood to mean catalysts which contain a carrier material of which the surface is provided with a catalytically active material in highly dispersed form. The carrier material should provide a stable platform for the catalytically active material and be stable under the selected reaction conditions.

The catalyst contains a basic carrier material suitable for dispersing the catalytically active material in the reaction mixture. Basic carrier materials are understood to mean those carrier materials which have basic sites, that is, can function as a Brønsted Base (proton acceptor) or Lewis Base (electron pair donor). Basic carrier materials are, for example, metal oxides, mixed hydroxides, mixed oxides, zeolites, or clay minerals.

In a preferred embodiment, the basic carrier material has a BET surface area of less than 150 $m^2/g$, preferably less than 100 $m^2/g$, particularly preferably less than 50 $m^2/g$. The basic carrier material preferably has a BET surface area in the range of 5 to 150 $m^2/g$, preferably in the range of 10 to 100 $m^2/g$. The BET surface area is also referred to as the specific surface area and can be determined according to ISO 9277:2010 using nitrogen as the adsorbate.

Preferred basic carrier materials contain a mixture of divalent and trivalent cations.

The basic carrier material preferably contains at least one type of divalent cation $M^{2+}$ selected from the group consisting of magnesium ($Mg^{2+}$), nickel ($Ni^{2+}$), iron ($Fe^{2+}$), cobalt ($Co^{2+}$), copper ($Cu^{2+}$), zinc ($Zn^{2+}$), calcium ($Ca^{2+}$), tin ($Sn^{2+}$), lead ($Pb^{2+}$) and combinations thereof. In a preferred embodiment, the divalent cation $M^{2+}$ is magnesium ($Mg^{2+}$).

The basic carrier material preferably contains at least one type of trivalent cation $M^{3+}$ selected from the group consisting of aluminum ($Al^{3+}$), iron ($Fe^{3+}$), chromium ($Cr^{3+}$), manganese ($Mn^{3+}$) and combinations thereof. In a preferred embodiment, the trivalent cation $M^{3+}$ is aluminum ($Al^{3+}$).

The ratio of di- to trivalent cations is variable, preferably in the range of 1:7 to 7:1, preferably in the range of 1:5 to 5:1, most preferably in the range of 1:3 to 3:1.

Preferred basic carrier materials are layered double hydroxides (LDH) of formula $$[M^{2+}_{1-w}M^{3+}_{w}(OH)_2]^{w+}(A^{n-}_{w/n})\cdot mH_2O, \text{ where}$$

$M^{2+}$ represents divalent cations, $M^{3+}$ represents trivalent cations and $A^{n-}$ represents anions with charge n, m represents the number of water molecules and w represents the molar ratio between trivalent cations and the total amount of cations.

Preferably, layered double hydroxides are crystalline materials consisting of lamellar-like structures.

In a preferred embodiment, the layered double hydroxide contains exactly one type of divalent cation.

In a preferred embodiment, the layered double hydroxide contains exactly one type of trivalent cation.

Preferably, the divalent cation is magnesium ($Mg^{2+}$) and the trivalent cation is aluminum ($Al^{3+}$).

The layered double hydroxide preferably contains at least one type of anion selected from the group consisting of hydroxides ($OH^-$), carbonates ($CO_3^{2-}$), nitrates ($NO_3^-$), sulfates ($SO_4^{2-}$) and chlorides ($Cl^-$).

The basic carrier material can be a hydrotalcite or a hydrotalcite-like compound. Hydrotalcite is understood by a person skilled in the art to mean aluminum-magnesium hydroxycarbonates.

In a preferred embodiment, the basic carrier material is a hydrotalcite of formula $$Mg_6Al_2(OH)_{16}(CO_3)\cdot 4H_2O.$$

The catalyst contains platinum and optionally nickel, which are hereinafter referred to individually or jointly as metal species. The metal species forms the catalytically active sites of the catalyst. The term "metal species" does not convey any statement about the oxidation state of the platinum or nickel. In other words, it does not denote the presence of the elemental state with the oxidation state 0. The term "oxidation state" used herein and known to the person skilled in the art means the formal charge of an atom within a compound or the actual charge of monatomic ions. By definition, atoms in the elemental state have the oxidation state 0.

In the case of the base-catalyzed depolymerization of lignin, the basic carrier material alone can also act catalytically. However, this reaction is not selective as defined in the present invention and does not enable high yields of the desired phenolic components. Surprisingly, providing the basic carrier material with platinum and optionally nickel makes it possible to achieve the desired selectivity of the catalytic depolymerization of the lignin and increases the yield of the desired product fractions.

Preferably, the catalyst contains no more than 15 wt. % of the metal species, based on the total weight of carrier material and the metal species, particularly preferably no more than 12 wt. %, in particular no more than 9 wt. %.

In a preferred embodiment, the catalyst contains the metal species in a range of 1-15 wt. %, for example 15 wt. % metal species, 10 wt. % metal species, 9 wt. % metal species, 8 wt. % metal species, 7 wt. % metal species, 6 wt. % metal species, 5 wt. % metal species, 4 wt. % metal species, 3 wt. % metal species, 2 wt. % metal species, or 1 wt. % metal species.

The catalyst can contain platinum at a weight percentage of 1-10 wt. %, for example 1 wt. %, 2 wt. %, 3 wt. %, 4 wt. %, 5 wt. %, 6 wt. %, 7 wt. %, 8 wt. %, 9 wt. %, 10 wt. %, or intermediate levels thereof. This means that 1-10% of the total weight of the catalyst, containing carrier material and metal species, consists of platinum species. In a preferred embodiment, the catalyst contains platinum at a weight percentage of 2-8 wt. %, more preferably 3-7 wt. %.

The platinum is preferably present as metal platinum, i.e. in the oxidation state 0.

The catalyst can contain nickel at a weight percentage of 0-5 wt. %, for example 0 wt. %, 1 wt. %, 2 wt. %, 3 wt. %, 4 wt. %, 5 wt. % or intermediate levels thereof. This means that 0-5% of the total weight of the catalyst, containing carrier material and metal species, consists of nickel species. In a preferred embodiment, the catalyst contains nickel at a weight percentage of 0.1-5 wt. %, more preferably 1-4 wt. %.

In a preferred embodiment, the catalyst contains 5 wt. % platinum and 1 wt. % nickel.

In a further preferred embodiment, the catalyst contains 5 wt. % platinum and 2 wt. % nickel.

In a further preferred embodiment, the catalyst contains 5 wt. % platinum without nickel.

Preferably, the metal species is present in particulate form on the basic carrier material.

It may be preferred for the surface area of the platinum-comprising particles of the metal species to be at least 1 $m^2/g$, more preferably at least 2 $m^2/g$, even more preferably at least 4 $m^2/g$. The surface area of the platinum-comprising particles of the metal species can be determined using the method of CO adsorption described later, which comprises a reduction step.

In a preferred embodiment, the catalyst has a BET surface area of less than 50 $m^2/g$, preferably less than 40 $m^2/g$, particularly preferably less than 20 $m^2/g$. The basic carrier material preferably has a BET surface area in the range of 3 to 50 $m^2/g$, preferably in the range of 4 to 40 $m^2/g$. The BET surface area of the catalyst can likewise be determined according to ISO 9277:2010 using nitrogen as the adsorbate.

Suitable catalysts can be produced by a number of methods known to a person skilled in the art, such as precipitation methods, impregnation methods, adsorption methods or ion exchange methods.

Suitable catalysts are preferably obtained by impregnating the basic carrier material with a solution of at least one compound of the at least one metal of the metal species, followed by reduction. Optionally, thermal treatment may be performed before or after the reduction.

Suitable catalysts can be produced, for example, by a method comprising

I) impregnating the basic carrier material with a solution containing at least one compound of at least one metal of the metal species and a solvent;

II) a reduction step.

In step I), the basic carrier material is impregnated with a solution of at least one compound of at least one metal of the metal species. In this step, the material to be impregnated, in the present case the basic carrier material, is brought into contact with a solution of the compound or compounds of the at least one metal of the metal species.

As a result of the impregnation step, a basic carrier material that is impregnated (i.e., loaded with the at least one compound of the metal or metals of the metal species) is obtained. The preferred result is that the basic carrier material is provided homogeneously or uniformly with this at least one compound of the at least one metal of the metal species.

Various impregnation methods are known to a person skilled in the art, for example capillary-controlled impregnation (so-called "incipient wetness" methods) and diffusion-controlled impregnation (so-called "adsorption-controlled" methods). In principle, both approaches are suitable for producing suitable catalysts for the present invention.

Impregnation is generally understood to mean the bringing together of a carrier material with a compound and the resulting adsorption of the compound on the surface of the carrier material. In the case of a porous carrier material, this is in particular also an inner surface, i.e., a surface located within the pores.

The bringing together is performed, for example, by adding a solution of the at least one compound of the at least one metal of the metal species to a suspension of the basic carrier material in a solvent and mixing this mixture. However, it is also possible to spray such a solution onto the basic carrier material or to add the basic carrier material to such a solution and then to mix this mixture. Methods for mixing such systems are known to a person skilled in the art and comprise, for example, stirring or kneading, and compulsory mixers, free-fall mixers, stirrers, kneaders, flow mixers or mixing pumps can be used.

Preferably, the composition containing the basic carrier material and the solution is continuously mixed during the impregnation step.

In a preferred embodiment, the basic carrier material is present in suspended form in the solution during the impregnation step. For the purposes of the present invention, a suspension is a mixture of a solid and a liquid, wherein the solid is uniformly dispersed in the liquid in the form of finely dispersed solid matter.

In an alternative embodiment, the basic carrier material and the solution are present in the form of an impregnated powder during the impregnation step. This means that the solution is only added to such an extent that the basic carrier material is wetted.

If the basic carrier material is to be impregnated with several compounds of the at least one metal of the metal species simultaneously, it may be preferable to provide the relevant compounds in one solution. However, it may also be preferable to provide the relevant compounds in separate solutions. Both variants are suitable for providing the basic carrier material simultaneously with, for example, platinum and nickel.

According to the invention, the amount of the metal species in the solution can vary within wide ranges. The "amount of the metal species" refers to the platinum-plus-optionally-nickel content in the solution. Particularly good results are obtained when the solution contains the metal species in an amount of at least 1 wt. % based on the amount of solvent, in particular at least 2 wt. %, preferably at least 5 wt. %, more preferably at least 10 wt. %. In particular, the solution can contain the metal species in an amount in the range of 1 wt. % to 80 wt. %, in particular in the range of 2 wt. % to 70 wt. %, preferably in the range of 5 wt. % to 60 wt. %, more preferably in the range of 10 wt. % to 50 wt. %.

The impregnation step can be performed at room temperature. However, the impregnation step can also be performed at a temperature lower or higher than room temperature. During the impregnation step, the temperature of the mixture containing basic carrier material and the solution can be, for example, 10° C. to 90° C., more preferably 20° C. to 80° C.

The duration of the impregnation step is selected such that the at least one compound of the at least one metal of the metal species can be precipitated in a sufficient amount on the basic carrier material. A suitable duration can be determined by a person skilled in the art on the basis of routine experiments.

Preferably, the at least one compound of the at least one metal of the metal species is completely precipitated from the solution onto the basic carrier material. After the impregnation step, the solvent is accordingly free of the compound of the at least one metal of the metal species. A person skilled in the art understands "free of the compound" to mean a concentration which can no longer be detected by means of noble metal detection using tin chloride in a hydrochloric acid environment, a method known in principle to a person skilled in the art.

The amount of basic carrier material used during production depends on the desired amount of the metal species to be precipitated on the basic carrier material and thus also on the concentration of the used solution of the at least one compound of the at least one metal of the metal species.

During the impregnation step, the basic carrier material is present, for example, in a range of 5 wt. % to 95 wt. %, based on the total amount of solution and basic carrier material, more preferably in a range of 10 wt. % to 90 wt. %.

The at least one compound of the at least one metal of the metal species can preferably be converted to the elemental state via thermal decomposition or by wet-chemical reduction.

Suitable compounds of the at least one metal of the metal species are, for example, salts, complex compounds or organometallic compounds.

Platinum compounds which can be used for impregnating a basic carrier material are known to a person skilled in the art. For example, the platinum compound is a Pt(II) or a platinum(IV) compound, e.g., a Pt(II) or Pt(IV) salt or a Pt(II) or Pt(IV) complex compound or a Pt organometallic compound. Examples of platinum compounds that can be mentioned are a platinum halide or an acid thereof, hexachloroplatinic acid or a salt of this acid, potassium tetrachloroplatinate, platinum nitrate, platinum acetylacetonate, platinum oxalate or a mixture of at least two of these compounds.

Nickel compounds which can be used for impregnating a basic carrier material are also known to a person skilled in the art. For example, the nickel compound is an Ni(II) compound, e.g., an Ni(II) salt or an Ni(II) complex compound or an Ni organometallic compound. Examples of nickel compounds that can be mentioned are a nickel nitrate, a nickel hydroxide, a nickel halide or a mixture of at least two of these compounds.

The solution further contains at least one solvent.

The solution can also contain further components, such as acids.

The at least one solvent can be selected from the group consisting of water and organic solvents. Organic solvents can be, for example, alcohols, such as methanol or ethanol.

Optionally, the impregnated basic carrier material obtained according to step I) may first be dried before performing the reduction in step II), and thereby partially or completely freed of the solvent.

It may be preferable to filter off and dry the impregnated basic carrier material.

The impregnated carrier material is dried, for example, at a temperature below 250° C., more preferably below 200° C., even more preferably below 150° C.

In particular, the drying can be performed under reduced pressure, preferably at a pressure below 300 mbar.

Preferably, the drying is performed for a period of 0.5 h to 24 h, more preferably for a period of 2 h to 20 h.

Optionally, the method can also comprise a thermal treatment of the impregnated carrier material after step I) and before step II). Such a thermal treatment is also known to a person skilled in the art as calcination.

In a preferred embodiment, the thermal treatment of the impregnated basic carrier material leads to decomposition of the at least one compound of the at least one metal of the metal species.

The thermal treatment is preferably performed in the presence of oxygen.

In one embodiment, and if drying has not been performed, the optional thermal treatment leads to evaporation of the solvent. In one embodiment, the thermal treatment evaporates the solvent and completely decomposes the at least one compound of the at least one metal of the metal species.

The thermal treatment can take place at a temperature of less than 1000° C., 900° C., 800° C., 700° C., 600° C., 500° C., 400° C., or less than 300° C. In one embodiment, the impregnated basic carrier material is thermally treated at a temperature of 150° C. to 250° C.

Preferably, the impregnated basic carrier material is thermally treated in multiple stages. This is to be understood as meaning that the impregnated basic carrier material is firstly thermally treated at a first temperature and then at at least one further temperature. Preferably, the first temperature is lower than the at least one further temperature. Preferably, the first temperature is in the range of 100-200° C. Preferably, the at least one further temperature is in the range of 200-300° C.

In a further preferred embodiment, the temperature is increased during the thermal treatment.

The increase in temperature may be stepwise or continuous or a combination of a stepwise and a continuous increase.

Preferably, the thermal treatment is performed for a period of 0.5 h to 24 h, preferably for a period of 2 h to 18 h.

In step II) of the method for producing a suitable catalyst, a reduction takes place. This is to be understood as meaning that the at least one compound of the at least one metal of the metal species that is present on the basic carrier material after impregnation is converted to a lower oxidation state.

In the case of compounds of the platinum, it may be preferred, for example, to convert the platinum from the Pt(II) or Pt(IV) oxidation state to the Pt(0) oxidation state.

In the case of compounds of the nickel, it may be preferred, for example, to convert the nickel from the Ni(II) oxidation state to the Ni(0) oxidation state.

Methods for reduction and suitable reducing agents are known in principle to a person skilled in the art. The reduction step can be performed, for example, under a reducing atmosphere or wet-chemically. In particular, the reduction step can be performed under a forming gas atmosphere, with reducing acids, the salts thereof or reducing boron compounds. Forming gas is understood by a person skilled in the art to be a gas mixture containing nitrogen and hydrogen, for example 95 vol. % nitrogen and 5 vol. % hydrogen. In the case of wet-chemical reduction, formic acid or a salt of formic acid, for example sodium formate, is preferably used as the reducing agent.

In the case of wet-chemical reduction, the reduction step can be performed directly in the impregnation solution, i.e., the impregnated carrier material which was obtained after step I) is not separated from the solvent. In other words, it may be preferred to add the reducing agent directly after step I).

The reduction step is performed, for example, at a temperature below 400° C., more preferably below 350° C., particularly preferably below 300° C. In the case of wet-chemical reduction, it may be preferred to perform the reduction at a temperature of below 100° C.

Preferably, the reduction step is performed for a period of 0.5 h to 24 h, more preferably for a period of 2 h to 15 h.

It may be preferred to subject the material obtained in step II) to a further method step.

For example, it may be preferred to dry the material obtained after step II), and thereby partially or completely free it of the solvent.

In a preferred embodiment, the material obtained in step II) is filtered off and dried.

The drying is performed, for example, at a temperature below 250° C., more preferably below 200° C., even more preferably below 150° C.

In particular, the drying can be performed under reduced pressure, preferably at a pressure below 300 mbar.

Preferably, the drying is performed in the absence of oxygen.

Preferably, the drying is performed for a period of 0.5 h to 24 h, more preferably for a period of 2 h to 20 h.

In the method according to the invention, the reaction mixture A in method step a) comprises, in addition to lignin and the catalyst, a solvent.

The solvent can contain multiple chemical substances, i.e., the solvent can also be a solvent mix. The solvent can contain water and/or an organic solvent. The organic solvent may be an alcohol, such as methanol, ethanol, propanol, isopropanol or a ketone such as acetone.

The reaction mixture A can comprise the solvent in an amount of at least 60 wt. %, more preferably at least 70 wt. %, even more preferably at least 80 wt. %.

The solvent preferably contains at least 10 wt. % water based on the total weight of the solvent, more preferably at least 20 wt. %, most preferably at least 30 wt. %. For example, the solvent contains water in the range of 10-80 wt. %, more preferably in the range of 20-70 wt. %, even more preferably in the range of 30-60 wt. %.

The solvent preferably contains water and an alcohol, preferably water and methanol, water and ethanol, water and propanol, or water and isopropanol. The solvent preferably contains 5-95 wt. % alcohol, more preferably 15-85 wt. %, even more preferably 25-75 wt. %, most preferably 30-60 wt. %.

The use of the catalyst described herein allows for selective catalytic de-polymerization of the lignin using lower amounts of catalyst than described in the prior art. In a preferred embodiment, the catalyst is present in the reaction mixture A in an amount of less than 30 wt. % based on the total amount of catalyst and lignin, preferably less than 20 wt. %, more preferably less than 10 wt. %, particularly preferably less than 5 wt. %. In a preferred embodiment, the catalyst is present in the reaction mixture A in a range of 0.1-30 wt. % based on the total amount of catalyst and lignin, preferably in a range of 0.5-20 wt. %, more preferably in a range of 1-15 wt. %.

In a method step b), the method according to the invention comprises heating the reaction mixture A.

The exact decomposition conditions depend on the lignin used, the catalyst used and the desired product composition.

The reaction mixture A can be stirred during the method.

The reaction mixture A is heated to a reaction temperature. This is understood to mean the temperature reached after a phase of heating the reaction mixture. The reaction temperature is preferably reached after a heating phase of not more than 90 min, more preferably not more than 60 min.

Preferably, the reaction mixture A is heated to a reaction temperature of below 400° C., more preferably below 300° C., most preferably below 250° C. Preferably, the reaction mixture A is heated to a reaction temperature in the range of 50° C. to 400° C., preferably to a reaction temperature in the range of 100° C. to 300° C., more preferably to a reaction temperature in the range of 150° C. to 250° C.

In a preferred embodiment, the reaction temperature in method step b) is maintained over a period of less than 240 min, more preferably over a period of less than 180 min, in particular over a period of less than 150 min. Preferably, reaction temperature is maintained over a period of 5 to 240 min, particularly preferably over a period of 20 to 180 min, in particular over a period of 30 to 150 min.

Methods for heating a reaction mixture are known in principle. In a preferred embodiment, the heating is performed by jacket heating.

The method according to the invention enables the decomposition of lignin without applying elevated pressure.

In a preferred embodiment, the method is performed in a closed container.

Since gaseous products can also form during the thermal treatment of reaction mixture A, the pressure in the container in which the thermal treatment is performed can increase. The pressure during step b) can be less than 150 bar, preferably less than 100 bar, particularly preferably less than 50 bar. The pressure during step b) is preferably between 0.1 bar and 35 bar, more preferably 1 bar to 10 bar, in particular 1 bar to 5 bar.

A further advantage of the method according to the invention is that it is not necessary to operate in a hydrogen atmosphere or an inert gas atmosphere.

Through the method according to the invention, a mixture B is obtained which comprises a product mix, the catalyst and the solvent.

The product mix contains monomeric and oligomeric products which are soluble in organic solvents. The product mix can also comprise further products, such as polymeric lignin rearrangement products or gaseous products. The gaseous products typically contain $CO_2$ and $H_2$. In addition, the product mix can contain products which are water-soluble and are referred to as the water-soluble product fraction.

For the definition of the terms "monomeric products", "oligomeric products" and "polymers", reference is made in principle to the IUPAC definition. "Oligomers" are understood to mean molecules of medium molecular weight that consist of multiple smaller repeating units. Medium molecular weight means that the properties of the molecule do not change when one or a few of the smaller units are removed. The term "oligomer" preferably comprises compounds having at least three and/or up to 20 monomeric units.

In the context of the present invention, such products are referred to as monomeric or oligomeric components which are obtained from lignin by the method according to the invention.

The monomeric products are preferably soluble in ethyl acetate. The oligomeric products are preferably soluble in THF.

The monomeric and oligomeric products preferably comprise building blocks containing at least one aromatic ring with at least one oxygen-containing substituent. In other words, the monomeric and oligomeric products preferably comprise mainly phenolic building blocks. The presence of phenolic building blocks can preferably be determined by Folin-Ciocalteu titration of the OH groups.

Preferably, the monomeric and oligomeric products comprise at least 40 wt. % phenolic building blocks, based on the total weight of monomeric and oligomeric constituents, more preferably at least 50 wt. %.

Preferably, the method according to the invention yields a product mix in which at least 50 wt. % of the lignin used in reaction mixture A has been converted to monomeric and oligomeric products, more preferably at least 60 wt. %. In other words, in the method according to the invention, a yield of at least 50 wt. % of the target products is obtained and the proportion of undesirable by-products is minimized. For the purposes of the present invention, undesirable by-products are understood to be the coke fraction, the water-soluble product fraction and the gaseous product fraction.

The yield is determined using the formula yield (in wt. %)=(weight of monomeric products+weight of oligomeric products/weight of lignin used)×100.

Preferably, a product mix containing less than 30 wt. % of the coke fraction is obtained by the method according to the invention. This means that less than 30 wt. % of the resulting product mix, which contains polymeric, monomeric and oligomeric components, and possibly a water-soluble fraction and gaseous products, consists of this insoluble fraction. More preferably, less than 25 wt. % of the coke fraction is obtained, even more preferably less than 20 wt. %, most preferably less than 10 wt. %.

Preferably, a product mix containing at least 5 wt. % monomeric products, more preferably at least 10 wt. %, is obtained by the method according to the invention. Preferably, a product mix containing 1-30 wt. % monomeric products, more preferably 5-20 wt. %, is obtained by the method according to the invention.

Preferably, a product mix containing less than 20 wt. % monomeric products having no aromatic moiety, more preferably less than 15 wt. %, even more preferably less than 10 wt. %, is obtained by the method according to the invention.

Preferably, the monomeric products comprise no more than 20 carbon atoms, preferably no more than 15 carbon atoms.

The monomeric products preferably have an average molecular weight of less than 1500 g/mol, more preferably less than 1000 g/mol. The average molecular weight can be determined via gel permeation chromatography (GPC).

The product mix preferably comprises at least one monomeric product containing a phenolic building block. The presence of such products having phenolic OH groups can be determined by the Folin-Ciocalteu method.

Preferably, the total weight of monomeric products comprises at least 40 wt. % monomeric products comprising an aromatic system with at least one oxygen-containing substituent, more preferably at least 50 wt. %, even more preferably at least 60 wt. %. The proportion of these monomeric products can be determined by means of gas chromatography-mass spectrometry (GC-MS).

The monomeric products preferably comprise at least one product from the group containing alkylated phenols, alkylated alkoxyphenols, catechols, alkylated catechols and alkylated alkoxycatechols. The monomeric products can be characterized by means of GC-MS.

Preferably, a product mix containing at least 40 wt. % oligomeric products, more preferably at least 50 wt. %, even more preferably at least 60 wt. %, is obtained by the method according to the invention.

The oligomeric products preferably have an average molecular weight of less than 10,000 g/mol, more preferably less than 8,000 g/mol.

Preferably, the oligomeric products have an average molecular weight of no more than 70% of the average molecular weight of the lignin originally used, more preferably no more than 60%, even more preferably no more than 55%.

The product mix preferably comprises at least one oligomeric product of which the monomeric building blocks contain a phenolic building block. The presence of such products having phenolic OH groups can be determined by the Folin-Ciocalteu method.

The oligomeric products preferably comprise at least one oligomer containing monomers selected from the group containing alkylated phenols, alkylated alkoxyphenols, catechols, alkylated catechols and alkylated alkoxycatechols.

In a preferred embodiment, the catalyst is separated from the mixture B after the method according to the invention has been performed. This separation may be performed, for example, by filtration.

The method can also comprise a method step in which the product mix is separated from the mixture B. The complete product mix or parts of the product mix can be separated, for example, by filtration, evaporation, distillation, centrifugation, decanting, sedimentation or other methods known to a person skilled in the art.

In a preferred embodiment, the method according to the invention can comprise a step for fractionating, isolating or purifying the mixture B.

In a preferred embodiment, the method according to the invention is part of a process in which biomass is divided into different streams and the lignin portion is decomposed.

In a preferred embodiment, the method comprises a further step in which a phenolic resin is produced from at least one of the components of the product mix.

The present invention also relates to a product mix which is obtained by the method according to the invention and which comprises monomeric and oligomeric products. For preferred embodiments, reference is made to the explanations above.

The present invention also relates to a catalyst suitable for use in the method according to the invention. For preferred embodiments, reference is made to the explanations above.

In the following, the invention is illustrated in specific terms by means of exemplary embodiments, which are not to be understood as limiting, however.

Measuring Methods

Platinum and Nickel Content of the Catalyst

The platinum and nickel content was determined via inductively coupled plasma optical emission spectrometry (ICP-OES).

BET Surface Area

The BET surface area was determined in accordance with ISO 9277:2010 using nitrogen as adsorbate at 77 K according to the BET theory (multi-point method).

CO Adsorption (Noble Metal Surface)

The noble metal surface of the catalysts was determined via CO adsorption. For this purpose, a catalyst was first reduced for 20 minutes at 400° C. in a forming gas consisting of 95% argon and 5% hydrogen in a closed container. Subsequently, carbon monoxide (CO, with helium as carrier gas) was dosed in pulses into the container in which the catalyst was located. This was done until constant CO peaks were detected downstream of the catalyst. By determining the peak area of the dosed CO and by determining the peak area of the reacted CO, the amount of CO absorbed by the catalyst was determined. For this purpose, the integral of the area of reacted CO was subtracted from the integral of the area of dosed CO. The amount of CO absorbed in this way was used to calculate how much CO was stored per amount of catalytically active composition used. Using conversions, it was possible to determine the surface area of the active noble metal sites (often also referred to as the CO surface area or noble metal surface area) from the measured amount of CO stored at the active sites.

Gel Permeation Chromatography (GPC)

The molecular weight of the various components was determined by gel permeation chromatography (GPC, Thermo Scientific, Dionex ICS-5000+ with a PSS MCX analytical 100 A+1000 A+100 000 A column; 8 mm×300 mm, also Thermo Fischer). Characterization was performed at 30° C. with 0.1 mol/L NaOH as eluent at a flow rate of 0.5 mL/min. Detection took place at 280 nm.

Before injection, the samples were dissolved in 0.1 mol of L-1 NaOH and filtered through a membrane filter (0.45 μm). SEC calibration was performed using PSS standards (Polymer Standard Service, Mp: 976 000, 679 000, 470 000, 258 000, 194 000, 152 000, 78 400, 29 500, 10 200, 3 420, 891) and vanillin. The standards were likewise dissolved in NaOH (1 mg mL-1 in 0.1 mol/L NaOH.

Gas Chromatography-Mass Spectrometry (GC-MS)

Qualitative and quantitative analysis was performed using gas chromatography-mass spectrometry (GC-MS, SHIMADZU GC-MS-QP 2020, HP-SM5 capillary column, 60 m×0.25 mm×0.25 μm). The temperature of the system was raised from 50° C. to 300° C. at a heating rate of 10° C./min. Holding times of 5 min at 120° C. and 8 min at 280° C. were selected. Helium was used as the carrier gas. The injection temperature was 250° C. 5 mg of the sample was dissolved in 1 mL ethyl acetate, mixed with 100 μL toluene (with internal standard), and injected directly. 41 monomer components were used as standards for external calibration, and calibration was performed at concentrations of 300 mg/L to 0.3 mg/L in 10 steps in each case. In addition, a toluene with an internal standard was used.

Determination of Phenolic Groups

Phenolic groups were determined by the Folin-Ciocalteu method, in which hydroxyl groups are titrated with a colored indicator substance. The indicator system used was a complex system composed of molybdatophosphoric acid and tungstophosphoric acid ($3H_2O{\cdot}P_2O_5{\cdot}13WO_3{\cdot}5MoO_3{\cdot}10H_3O$ or $3H_2O{\cdot}P_2O_5{\cdot}14WO_3{\cdot}4MoO_3{\cdot}10H_2O$). The intensity of the blue complex after reduction is proportional to the concentration of the phenolic OH groups and was quantified by UV-VIS spectroscopy. The calibration substance used was vanillin, a substance with a known proportion of OH groups.

INVENTION EXAMPLE 1 (IE1)

145.5 g hydrotalcite (Sasol, BET surface area 19 $m^2/g$) was suspended in 800 mL deionized water and 4.5 g Pt was added as hexachloroplatinic acid ($H_2PtCl_6$ solution with 33% Pt, Heraeus). The suspension was stirred at 80° C. for two days. Subsequently, 22.5 g sodium formate was dissolved in 30 mL water at 70° C. and added to the suspension. The suspension was stirred overnight at 70° C. The suspension was then diluted with 1 L deionized water and filtered after cooling to room temperature. The residue was washed and finally dried at 120° C. The noble metal surface area of the catalyst was determined as 7 $m^2/g$.

INVENTION EXAMPLE 2 (IE2)

5 g Pt as platinum(II) nitrate ($Pt(NO_3)_2$ solution with 15.2% Pt, Heraeus) was diluted to 30 mL and homogenized. The solution was added to 95 g hydrotalcite (Sasol, BET surface area 19 $m^2/g$) and the mixture was homogenized. The mixture was dried overnight at 110° C. in a nitrogen atmosphere in vacuo. This was followed by thermal treatment for 14 h in an oxygen-containing atmosphere, during which the temperature was increased stepwise to 250° C. Finally, the material was treated for 16 h with forming gas (95 vol. % nitrogen, 5 vol. % hydrogen) at up to 250° C. The noble metal surface area of the catalyst was determined as 10 $m^2/g$.

INVENTION EXAMPLE 3 (IE3)

The production was carried out in the same way as IE2. In addition, 1 g Ni was added as nickel(II) nitrate hexahydrate ($Ni(NO_3)_2{*}6H_2O$ with 20% Ni, Merck) to the platinum(II) nitrate solution, which was diluted together and homogenized. This solution was added to 94 g hydrotalcite and the mixture was homogenized. The noble metal surface area of the catalyst was determined as 5 $m^2/g$.

INVENTION EXAMPLE 4 (IE4)

The production was carried out in the same way as IE2. In addition, 2 g Ni was added as nickel(II) nitrate hexahydrate ($Ni(NO_3)_2{*}6H_2O$ with 20% Ni, Merck) to the platinum(II) nitrate solution, which was diluted together and homogenized. This solution was added to 93 g hydrotalcite and the mixture was homogenized. The noble metal surface area of the catalyst was determined as 11 $m^2/g$.

Depolymerizations

Standard conditions for depolymerization are specified below. 20 g organosolv lignin (ChemicalPoint, average molecular weight 6,200 Da) was mixed with the catalyst and suspended in 200 mL solvent (45.9 vol. % ethanol in water).

The lignin was decomposed in an autoclave (PARR, 4871 Process Controller, software: SpecView3) at a stirring speed of 300 rpm. The reaction mixture was heated to the target temperature and kept at this temperature for the desired time.

After the mixture was cooled to room temperature, the catalyst was separated and then the product fractions were separated from one another. For this purpose, the mixture was adjusted using conc. hydrochloric acid (HCl 37 wt. %) to a pH of 2 to precipitate the lignin tar fraction (containing the oligomeric products). The solid constituents were then separated by vacuum filtration. The solid was washed 3 times with dilute hydrochloric acid. The water-soluble phase was extracted 3 times with ethyl acetate, and the organic phases were combined, dried over sodium sulfate, and filtered. The ethyl acetate was removed in a rotary evaporator, and the resulting solid was the lignin-oil fraction (containing the monomeric products). The solids obtained after vacuum filtration were slurried in THE to dissolve the oligomeric products, and the remaining solid constituents (the coke fraction, containing polymeric rearrangement products of lignin and further solid insoluble products) were again separated by vacuum filtration. The organic phase was evaporated off in a rotary evaporator to obtain the oligomeric product fraction.

The proportions of the yield for the various product fractions were calculated as follows:

yield of monomeric components (in wt. %)=(weight of lignin-oil fraction/weight of lignin used)×100;

yield of oligomeric components (in wt. %)=(weight of lignin-tar fraction/weight of lignin used)×100;

coke proportion (in wt. %)=(weight of coke fraction/weight of lignin used)×100.

Figure 3:
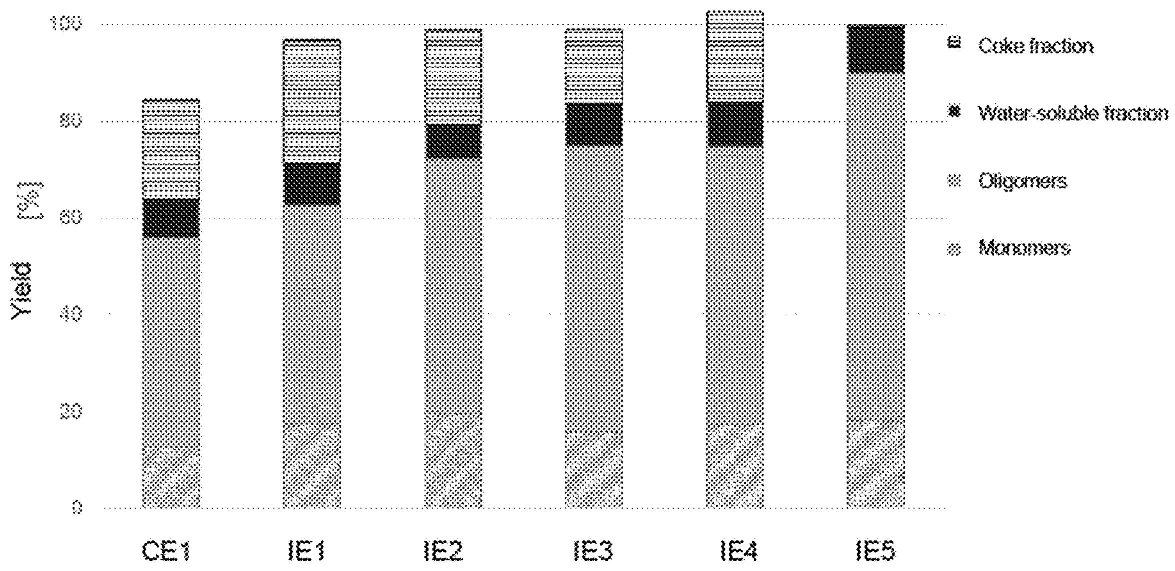
Figure 4:
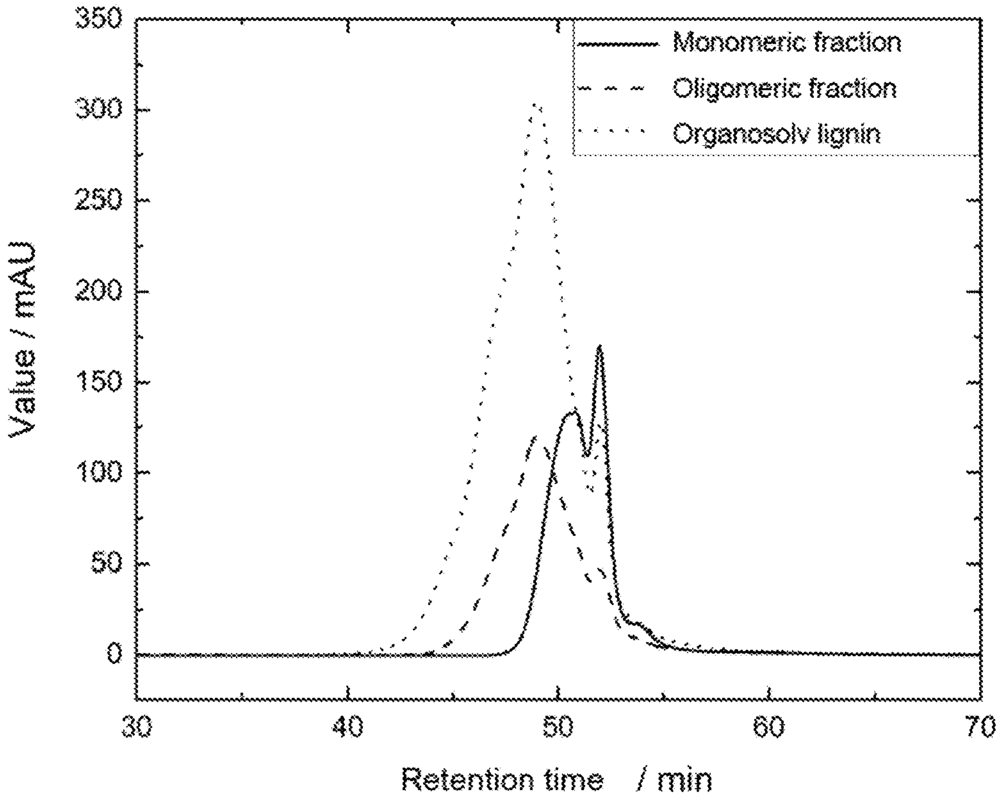
Figure 5:
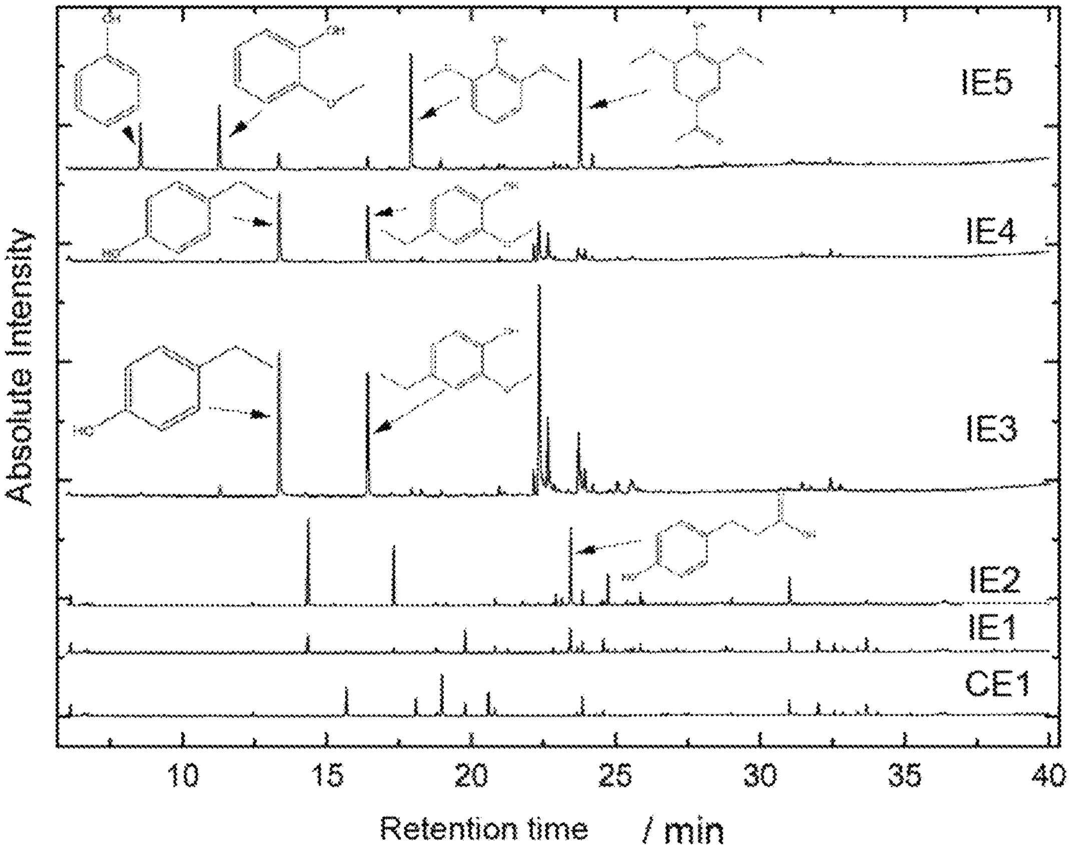

FIG. 3 shows the composition of the product mix of representative depolymerizations with 4 catalysts according to the invention (IE1-IE4) compared to a hydrotalcite without metal loading (CE1). The ratio of lignin and catalyst used was constant (20 wt. % catalyst), and all reactions were performed at 200° C. for 30 min. FIG. 4 also compares example GPC chromatograms used to analyze the average molecular weight of the lignin used, and the monomeric and the oligomeric product fractions of the depolymerization with IE3.

TABLE 1

| | Catalyst | $M_w$ [g/mol] Monomer fraction | OH groups [mmol/g] Monomer fraction | $M_w$ [g/mol] Oligomer fraction | OH groups [mmol/g] Oligomer fraction |
|---|---|---|---|---|---|
| CE1 | HTC | 600 | 5.3 | 12582 | 3.5 |
| IE1 | 3% Pt/HTC | 485 | 4.5 | 1585 | 3.3 |
| IE2 | 5% Pt/HTC | 462 | 5.1 | 1909 | 3.2 |
| IE3 | 5% Pt + 1% Ni/HTC | 838 | 5.2 | 3282 | 3.1 |
| IE4 | 5% Pt + 2% Ni/HTC | 754 | 5.4 | 3544 | 3.2 |
| IE5 | 5% Pt + 1% Ni/HTC | 809 | 4.2 | 2810 | 3.5 |

Table 1 summarizes the average molecular weights of the monomer and oligomer product fractions. The results illustrate that the conversion of the lignin used can be significantly increased using the catalysts according to the invention. The phenolic OH groups were titrated for both the lignin used and the product fractions according to the Folin-Ciocalteu method. Table 1 also contains these results. For all catalyst systems shown here, the concentration of the OH groups, which is representative of the presence of phenolic building blocks, was comparable to that of the lignin used (3.7 mmol/g), suggesting that these building blocks were retained during the decomposition reaction.

In IE5, the same catalyst as in IE3 was used, except that only 1.2 wt. % catalyst was used relative to the weight of lignin to be reacted. The depolymerization was performed at 230° C. for 90 min. IE5 illustrates that a high yield and the desired selectivity of the reaction can be achieved using small amounts of a catalyst according to the invention and under mild reaction conditions.

The invention claimed is:

1. A method for the catalyzed decomposition of lignin, comprising:

a) providing a reaction mixture A comprising lignin, a catalyst and a solvent;

b) heating the reaction mixture A so as to obtain a mixture B comprising a product mix, the catalyst and the solvent;

wherein the catalyst contains a basic carrier material, the basic carrier material being a layered double hydroxide (LDH) of the formula $$[M^{2+}_{1-w}M^{3+}_{w}(OH)_2]^{w+}(A^{n-}_{w/n})\cdot m\ H_2O,$$

where $M^{2+}$ are divalent cations, $M^{3+}$ are trivalent cations, and $A^{n-}$ are anions with charge n, m is the number of water molecules, and w is the molar ratio between trivalent cations and the total amount of cations; and a catalytically active material provided on a surface of the basic carrier material, the catalytically active material consisting of platinum species and nickel species, wherein the catalyst contains 1-10 wt. % of the platinum species, and 0.1-5 wt. % of the nickel species.

2. The method according to claim 1, wherein the lignin is selected from the group containing organosolv lignin, kraft lignin, lignin obtained by alkaline digestion, lignin obtained by the sulfate method, lignin obtained by the sulfite method, lignin obtained by extraction with water, lignin obtained by hydrolysis with acids, lignin obtained by enzymatic hydrolysis, lignin obtained by saccharification of wood, lignin obtained by treatment with micro-organisms, lignin from biorefinery process streams containing lignin, and mixtures thereof.

3. The method according to claim 1, wherein the solvent comprises water and an alcohol.

4. The method of claim 3, wherein the solvent comprises 10-30 wt % water.

5. The method according to claim 1, wherein the catalyst is present in the reaction mixture A in an amount of less than 30 wt. % based on the total amount of catalyst and lignin.

6. The method according to claim 1, wherein the reaction mixture A is heated to a reaction temperature of below 400° C.

7. The method according to claim 1, wherein the reaction temperature in method step b) is maintained over a period of less than 240 min.

8. The method according to claim 1, wherein the product mix contains less than 30 wt. % of a coke fraction.

9. The method according to claim 1, wherein at least 50 wt. % of the lignin used in the reaction mixture A is converted into monomeric and oligomeric products.

10. The method according to claim 1, wherein the product mix comprises at least one monomeric product containing a phenolic building block.

11. The method according to claim 1, wherein the product mix comprises at least one oligomeric product of which the monomer building blocks contain a phenolic building block.

12. The method according to claim 1, wherein the basic carrier material contains a mixture of divalent and trivalent cations.

13. The method according to claim 1, wherein the divalent cation $M^{2+}$ is selected from the group consisting of magnesium ($Mg^{2+}$), nickel ($Ni^{2+}$), iron ($Fe^{2+}$), cobalt ($Co^{2+}$), copper ($Cu^{2+}$), zinc ($Zn^{2+}$), calcium ($Ca^{2+}$), tin ($Sn^{2+}$), lead ($Pb^{2+}$), and combinations thereof.

14. The method according to claim 1, wherein the trivalent cation $M^{3+}$ is selected from the group consisting of aluminum ($Al^{3+}$), iron ($Fe^{3+}$), chromium ($Cr^{3+}$), manganese ($Mn^{3+}$), and combinations thereof.

15. The method according to claim 1, wherein the reaction mixture A is heated to a reaction temperature ranging from 100 to 300° C.

16. The method according to claim 1, wherein step b) is performed at a pressure ranging from 0.1 to 35 bar.

17. The method according to claim 1, wherein the catalyst contains no more than 9 wt % of the metallic species.

18. The method according to claim 1, wherein the platinum species have an oxidation state of zero and the nickel species have an oxidation state of zero.

* * * * *